(12) United States Patent
Fukuzawa et al.

(10) Patent No.: US 8,897,200 B2
(45) Date of Patent: Nov. 25, 2014

(54) RELAY SYSTEM, RELAY DEVICE AND SYNCHRONIZATION METHOD

(75) Inventors: Shoji Fukuzawa, Osaka (JP); Yoshiyuki Tanaka, Osaka (JP)

(73) Assignee: Icom Incorporated (JP)

( * ) Notice: Subject to any disclaimer, the term of this patent is extended or adjusted under 35 U.S.C. 154(b) by 162 days.

(21) Appl. No.: 13/121,931

(22) PCT Filed: Oct. 28, 2009

(86) PCT No.: PCT/JP2009/068533
§ 371 (c)(1),
(2), (4) Date: May 2, 2011

(87) PCT Pub. No.: WO2010/050530
PCT Pub. Date: May 6, 2010

(65) Prior Publication Data
US 2011/0199958 A1    Aug. 18, 2011

(30) Foreign Application Priority Data
Oct. 28, 2008   (JP) .................. 2008-277515

(51) Int. Cl.
*H04B 7/14* (2006.01)
*H04J 1/10* (2006.01)
*H04J 3/08* (2006.01)
*H04B 7/155* (2006.01)
*H04W 24/04* (2009.01)
*H04J 3/06* (2006.01)
*H04W 88/08* (2009.01)

(52) U.S. Cl.
CPC ............. *H04B 7/155* (2013.01); *H04J 3/0641* (2013.01); *H04W 24/04* (2013.01); *H04W 88/085* (2013.01)

USPC ............. 370/315; 370/350; 370/509; 455/15

(58) Field of Classification Search
USPC .......... 370/350, 509, 315; 455/9, 13.1, 426.1, 455/428, 15
See application file for complete search history.

(56) References Cited

U.S. PATENT DOCUMENTS 5,974,056 A * 10/1999 Wilson et al. .................. 370/509
6,590,891 B1 * 7/2003 Jacquet et al. ................. 370/350

(Continued)

FOREIGN PATENT DOCUMENTS

| CN | 101116363 | 1/2009 |
| JP | 09-298506 | 11/1997 |

(Continued)

OTHER PUBLICATIONS

Notification of Reasons for Rejection issued May 7, 2013 in Japanese Application No. 2009-248329, three pages.

(Continued)

*Primary Examiner* — Helal A Algahaim
*Assistant Examiner* — Mahmoud Ismail
(74) *Attorney, Agent, or Firm* — Baker & McKenzie LLP

(57) ABSTRACT

When no synchronization signal is transmitted over a system bus (115), a master repeater is arbitrarily selected from a plurality of repeaters ($111_2$ to $111_n$), starts transmitting a synchronization signal over the system bus (115), and transmits information to the system bus (115) in synchronization with the synchronization signal. Other slave repeaters transmit information to the system bus (115) in synchronization with the synchronization signal transmitted by the master repeater.

5 Claims, 8 Drawing Sheets

(56) References Cited

U.S. PATENT DOCUMENTS

2001/0018328 A1* 8/2001 Ohkura et al. .................. 455/15
2006/0111436 A1   5/2006 Griffin
2009/0029710 A1   1/2009 Ochiai et al.

FOREIGN PATENT DOCUMENTS

| JP | 2004-260382 | 9/2004 |
| JP | 2005-175808 | 6/2005 |
| JP | 2007-281800 | 10/2007 |
| WO | 2008/007418 | 1/2008 |

OTHER PUBLICATIONS

Notification of First Office Action issued May 24, 2013 in corresponding Chinese Application No. 200980143128.0.

* cited by examiner

FIG. 8

| REPEATER NO. | PRIORITY | REFERENCE TIME |
|---|---|---|
| 1(1111) | 1(DEFAULT) | 80 |
| 2(1112) | 12 | 104 |
| 3(1113) | 2 | 82 |
| 4(1114) | 3 | 84 |
| ⋮ | ⋮ | ⋮ |
| n(111n) | 4 | 86 |

RELAY SYSTEM, RELAY DEVICE AND SYNCHRONIZATION METHOD

RELATED APPLICATION

This application is based on Japanese patent application No. 2008-277515 filed on Oct. 28, 2008. The entire disclosure of the specification, the claims, and the drawings of such Japanese patent application is incorporated herein by reference in this specification.

TECHNICAL FIELD

The present invention relates to a relay system, a relay device and a synchronization method. More specifically, the present invention relates to a distributed relay system that allows a wireless terminal device to select at least one of plural relay devices to establish a communication with another wireless terminal device, the relay device and a synchronization method.

BACKGROUND ART

There is conventionally known a trunking type wireless communication system (hereinafter, referred to as a "trunking system") as a business land mobile wireless communication system. In a trunking system, a predetermined number of repeaters are present in a site, and a plurality of wireless terminal devices shear a predetermined number of communication channels through the predetermined number of repeaters. The trunking system includes a dedicated control type having a dedicated control channel and a distributed control type having no dedicated control channel. Based on control information from the control channel in the case of the former type and based on control information from a home repeater registered in each wireless terminal device beforehand in the case of the latter type, an unused communication channel is set to allow the wireless terminal devices to communicate with each other, so that the plurality of wireless terminal devices shear the predetermined number of communication channels. One of the plurality of repeaters functions as a master repeater, and the others function as slave repeaters, respectively. The slave repeater operates in synchronization with a synchronization signal output by the master repeater.

In this case, if individual repeaters output a synchronization signal on a communication line without any permission, it becomes difficult to establish a synchronization because of collision of such synchronization signals. Accordingly, only a specific repeater (which is called a "master repeater") selected from the plurality of repeaters outputs a synchronization signal to the communication line, other repeaters (which are called "slave repeaters") acquire a timing of information on a system bus in synchronization with the synchronization signal output by the master repeater. If a master repeater breaks down due to some reasons, it is necessary to select a new master repeater in the remaining slave repeaters.

For example, patent literature 1 discloses a technology which connects a master repeater and a plurality of slave repeaters one another over a system bus, and which automatically changes the master repeater to a new master repeater when the master repeater that outputs a synchronization signal breaks down. The master repeater generates a synchronization signal based on a reference signal output by a VCXO (an oscillator circuit), and outputs the generated synchronization signal to the plurality of other slave repeaters. Each repeater is connected to another repeater through a synchronization signal connector in order to transmit/receive the synchronization signal, and is connected to another repeater through an Ethernet (registered trademark) for a LAN connection for a control communication relating to a connection of a communication channel.

Patent literature 1 discloses that when it is determined that the master repeater outputting the synchronization signal breaks down, a main CPU of each slave repeater establishes a communication with another repeater through the Ethernet (registered trademark) for a LAN connection, and a relationship whether another repeater is the master repeater or a slave repeater at the time of breakdown.

Patent Literature 1: Unexamined Japanese Patent Application KOKAI Publication No. 2007-281800

DISCLOSURE OF INVENTION

Problem to be Solved by the Invention

According to patent literature 1, in a case in which the master repeater breaks down, when a relationship whether another repeater is the master repeater or a slave repeater is determined, a slave repeater communicates with a set of other repeaters through a LAN connection unit to determine such a relationship, but a specific procedure is not disclosed in patent literature 1. That is, the technology disclosed in patent literature 1 is merely an abstract desire, and a configuration that allows a person skilled in the art to carry out such a desire is not disclosed. Therefore, the disclosure of patent literature 1 does not overcome a problem that when the master repeater breaks down, a repeater selected from the other repeaters which served as slave repeaters automatically functions as a new master repeater.

The present invention has been made to overcome the foregoing problem, and it is an object of the present invention to provide a relay system, a relay device, and a synchronization method which allows, when a master relay device that outputs a synchronization signal to a communication line breaks down among a plurality of relay devices connected one another through the communication line, another relay device to continue an operation.

It is another object of the present invention to provide a relay system, a relay device, and a synchronization method which allows, when a master relay device that outputs a synchronization signal to a communication line among a plurality of relay devices connected one another through a communication line breaks down, another relay device to automatically serve as a new master relay device.

Means for Solving the Problem

In order to achieve the objects, a relay system according to a first aspect of the present invention comprises a plurality of relay devices which are connected one another through a communication line and to which respective unique relay channels are allocated, each relay device being configured to wirelessly transmit control information generated based on information obtained from the communication line to a wireless terminal device in order to select a relay channel for the wireless terminal device registered in the own relay device to communicate with an other wireless terminal device, wherein the plurality of relay devices comprise a master relay device which transmits a synchronization signal over the communication line and which communicates with the communication line in synchronization with the synchronization signal, and an other slave relay device which obtains the synchronization signal through the communication line and which communicates with the communication line in synchronization with the synchronization signal, and when each of the relay devices detects a condition in which no synchronization signal is transmitted over the communication line, a relay device starts transmitting a synchronization signal in accordance with a predetermined rule, and the relay device which has transmitted the synchronization signal serves as the master relay device.

In the relay system according to the first aspect, when detecting a condition in which no synchronization signal is transmitted over the communication line, each of the relay devices transmits a synchronization signal in accordance with a predetermined rule that is a different output timing.

In the relay system according to the first aspect, when each of the relay devices detects a condition in which no synchronization signal is transmitted over the communication line, a relay device selected in accordance with a predetermined rule starts transmitting a synchronization signal.

In order to achieve the objects, a relay device according to a second aspect of the present invention is connected to an other relay device through a communication line and to which a unique relay channel is allocated, the relay device being configured to wirelessly transmit control information generated based on information obtained from the communication line to a wireless terminal device in order to select a relay channel for the wireless terminal device registered in the own relay device to communicate with an other wireless terminal device, the relay device including: a function as a master relay device which transmits a synchronization signal over the communication line and which communicates with the communication line in synchronization with the synchronization signal; and a function as a slave relay device which obtains a synchronization signal through the communication line and which communicates with the communication line in synchronization with the synchronization signal, wherein when detecting a condition in which no synchronization signal is transmitted over the communication line, the relay device starts transmitting a synchronization signal in accordance with a predetermined rule, and when the relay device is the first relay device that has transmitted the synchronization signal, the relay device functions as the master relay device.

In order to achieve the objects, a synchronization method according to a third aspect of the present invention is in a relay system comprising a plurality of relay devices which are connected one another through a communication line and to which respective unique relay channels are allocated, the plurality of relay devices comprising a master relay device which transmits a synchronization signal over the communication line and which communicates with the communication line in synchronization with the synchronization signal, and an other slave relay device which obtains the synchronization signal through the communication line and which communicates with the communication line in synchronization with the synchronization signal, each relay device being configured to wirelessly transmit control information generated based on information obtained from the communication line to a wireless terminal device in order to select a relay channel for the wireless terminal device registered in the own relay device to communicate with an other wireless terminal device, wherein when detecting a condition in which no synchronization signal is transmitted over the communication line, each of the relay devices starts transmitting a synchronization signal in accordance with a predetermined rule, and the first relay device that has transmitted the synchronization signal serves as the master relay device.

Effect of the Invention

According to the present invention, when wireless terminal devices communicate each other through a plurality of relay devices connected one another through a communication line, even if a master relay device transmitting a synchronization signal to the communication line breaks down, a specific relay device selected among the remaining relay devices automatically functions as a master relay device through a specific procedure.

Moreover, according to the present invention, even if the master relay device does not break down, after the master relay device is removed from the plurality of relay devices connected to the communication line, a specific relay device selected from the remaining relay devices automatically functions as a master relay device.

Furthermore, according to the present invention, when the master relay device breaks down or after the master relay device is removed from the plurality of relay devices connected to the communication line, in an initial condition in which power is turned on again, a specific relay device selected from the plurality of relay devices automatically functions as a master relay device.

BRIEF DESCRIPTION OF DRAWINGS

FIG. 8 is a diagram showing an illustrative priority order to serve as a master repeater set to the repeater shown in FIG. 1.

BEST MODE FOR CARRYING OUT THE INVENTION

An explanation will be given of an embodiment of a relay system, a relay device and a synchronization method of the present invention with reference to the accompanying drawings.

Figure 1:
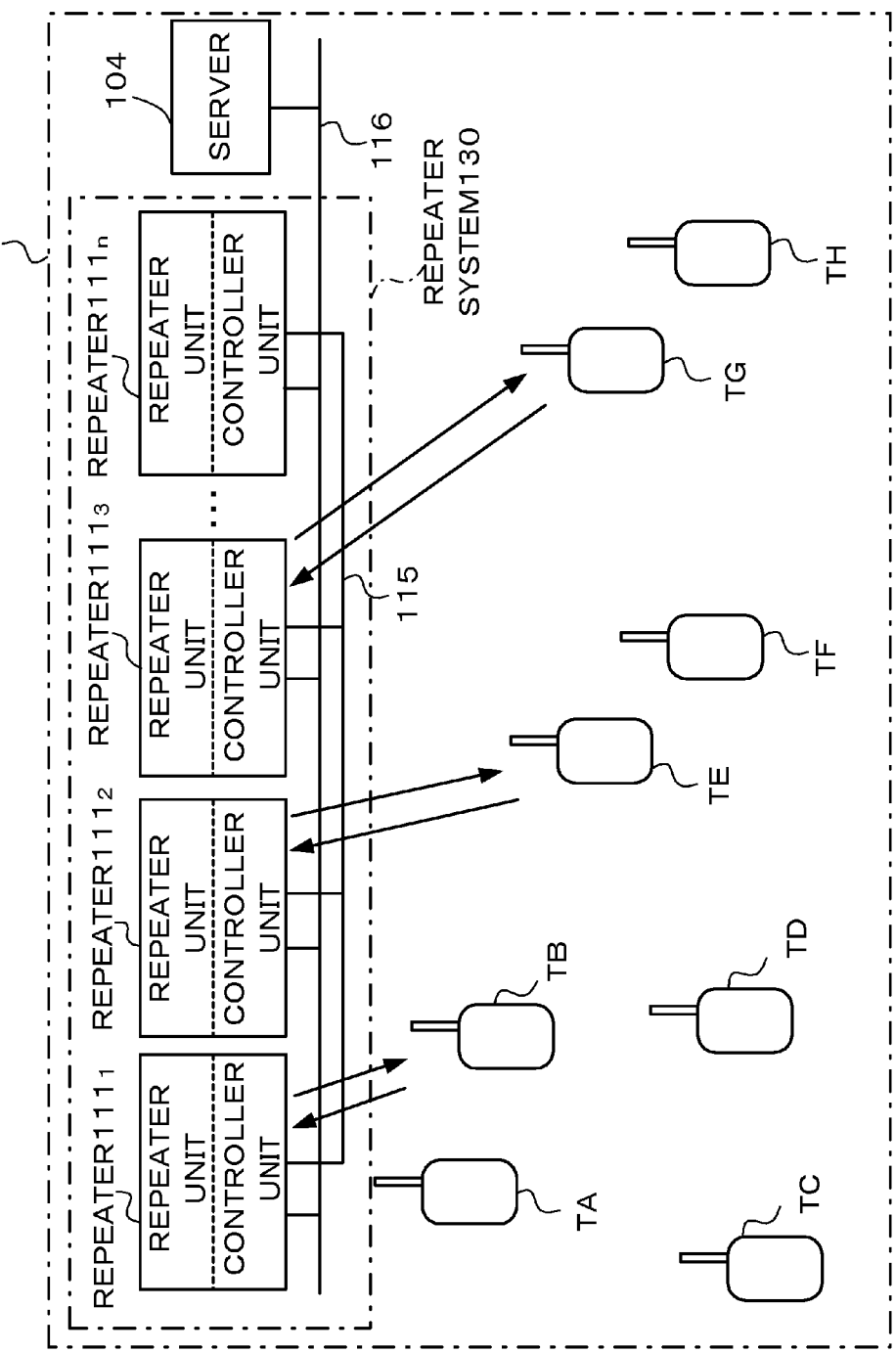
FIG. 1 is a diagram showing a configuration of a wireless communication system according to an embodiment of the present invention.

As shown in FIG. 1, a site 100 of a wireless communication system of the embodiment has plural (e.g., 30 devices at maximum) repeaters $111_1$ to $111_n$ which are connected one another through a communication line 115. A unique relay channel is allocated to each of the plural repeaters $111_1$ to $111_n$ to bear a relay process in the same communication area. The plural repeaters $111_1$ to $111_n$ connected one another through the communication line 115 configure a repeater system (a relay system) 130. That is, the repeater system 130 configures a communication area with n number of channels (where n is the number of repeaters). Moreover, the repeater system 130 including the plural repeaters $111_1$ to $111_n$ is connected to the server 104 through a communication line 116 like an IP connection line. In general, the communication line 115 is referred to as a "system bus", so that the communication line 115 is referred to as a system bus in the following explanation.

The server 104 can set various settings of the plural repeaters $111_1$ to $111_n$ through a remote operation. Each of the repeaters $111_1$ to $111_n$ comprises a repeater unit and a controller unit. Information (e.g., whether or not it is relaying a communication) on each of the repeaters $111_1$ to $111_n$ is exchanged over the system bus 115 and is shared. At which time slot each of the repeaters $111_1$ to $111_n$ transmits data is set beforehand. Hence, each of the repeaters $111_1$ to $111_n$ transmits data at a time slot set beforehand.

One repeater in the plural repeaters $111_1$ to $111_n$ is set as a "master repeater". Hereinafter, the explanation will be given of a case in which the repeater $111_1$ in the repeaters $111_1$ to $111_n$ shown in FIG. 1 serves as a master repeater. The master repeater transmits a synchronization signal for establishing a synchronization among the repeaters $111_1$ to $111_n$ including the local device to the system bus 115.

Each of wireless terminal devices TA to TH registers any one repeater in the repeaters $111_1$ to $111_n$ as a home repeater. Each of the wireless terminal devices TA to TH receives a downlink signal of a home repeater in a standby condition. Each of the wireless terminal devices TA to TH obtains idle channel information inserted in the downlink signal of the home repeater, and shifts the channel frequency to this idle channel, thereby communicating with another wireless terminal device. When a communication ends, the wireless terminal device returns the channel frequency to the channel frequency of the home repeater, and returns to a standby condition. In FIG. 1, the wireless terminal devices TA to TD register the repeater $111_1$ as a home repeater, the wireless terminal devices TE and TF register the repeater $111_2$ as a home repeater, and the wireless terminal devices TG and TH register the repeater $111_3$ as a home repeater.

The wireless communication system shown in FIG. 1 is a distributed trunking system that allows the wireless terminal devices TA to TH to shear the plurality of repeaters $111_1$ to $111_n$, and accordingly selects at least one repeater for relaying among those repeaters. The distributed trunking system has no dedicated channel for control all channels serve as control channels and communication channels. It is presumed as an example that the wireless terminal device TA communicates with another wireless terminal device TB to TD that is registered in the same home repeater. In this case, the wireless terminal device TA obtains channel information indicating available channels for communication included in a downlink signal from the repeater $111_1$ that is the home repeater for the wireless terminal device TA, and distinguishes the available channels based on the obtained channel information, selects one of the distinguished available channels (e.g., the channel of the repeater $111_3$), and shifts the channel frequency to the selected channel.

Moreover, the wireless terminal device TA transmits a call request to the channel (the repeater $111_3$), receives a response to the effect that a communication is permitted from the repeater $111_3$ that provides this channel, and establishes a link. The wireless terminal device TB to TD that is a communication counterparty receives a control signal which is transmitted from the home repeater $111_1$ and which instructs shifting to the communication channel (the channel of the repeater $111_3$) where the wireless terminal device TA has established the link, changes the channel frequency to that of the instructed channel, and communicates with the wireless terminal device TA. That is, the repeater $111_1$ serves as a control channel for the wireless terminal devices TA to TD that register the repeater $111_1$ as a home repeater, and serves as a communication channel for the other wireless terminal devices TE to TH. An example of the communication among the wireless terminal devices TA to TD are a group communication among the whole wireless terminal devices TA to TD, a group communication in which the unit of a group is further broken up, e.g., a small group including the wireless terminal devices TA and TB, or an individual call for a target that is a solo wireless terminal device.

Figure 2:
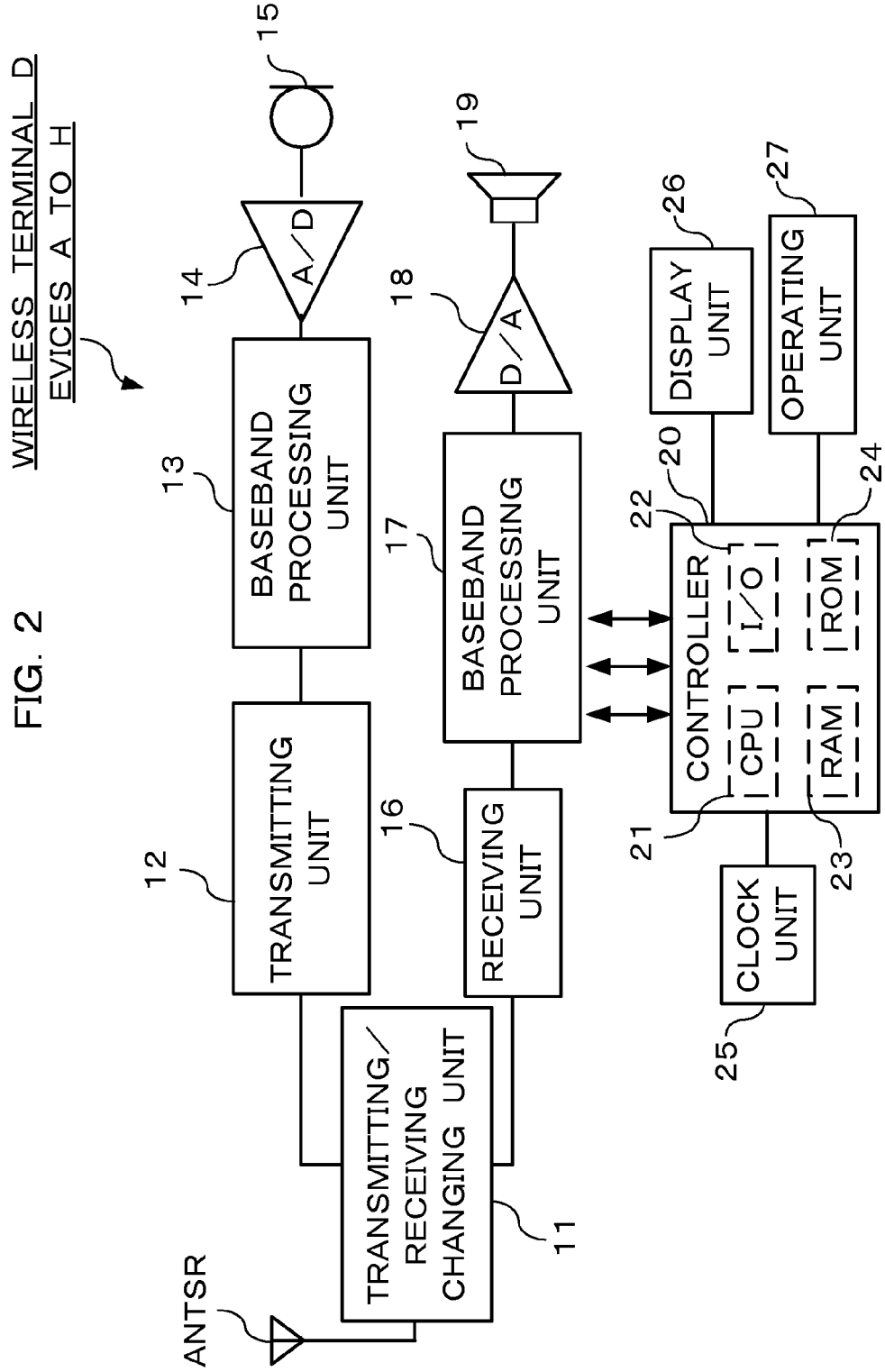
FIG. 2 is a block diagram showing a configuration of a wireless terminal device shown in FIG. 1.
Figure 3:
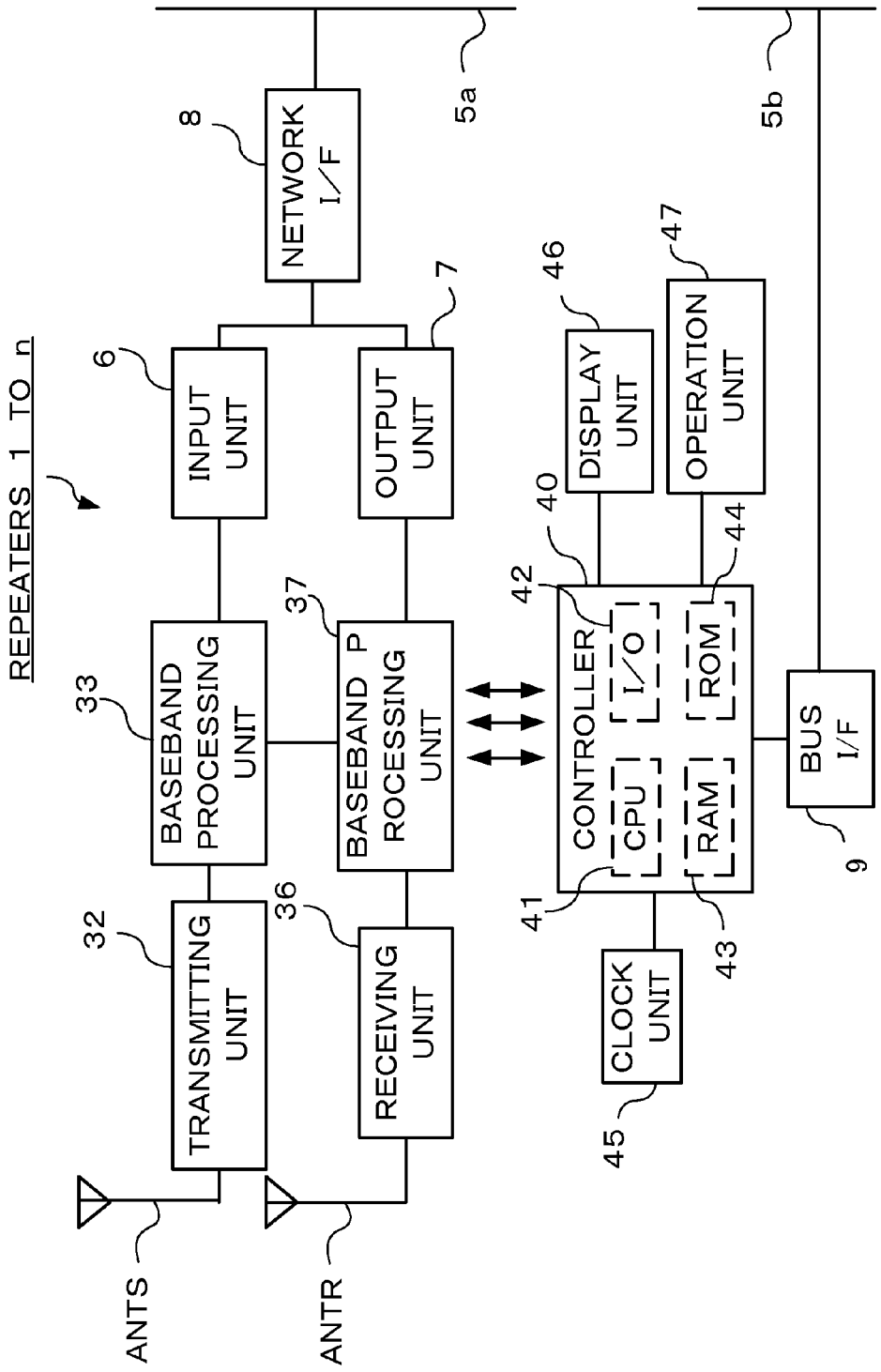
FIG. 3 is a block diagram showing a configuration of a repeater shown in FIG. 1.
Figure 4:
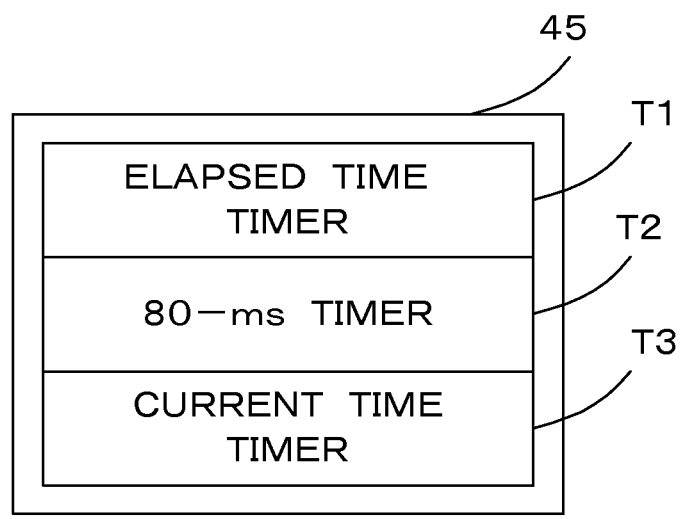
FIG. 4 is a diagram showing a configuration of a clock unit.

Next, an explanation will be given of a configuration and a function of each of the wireless terminal devices TA to TH and those of each of the repeaters $111_1$ to $111_g$. FIG. 2 is a block diagram showing a configuration of each of the wireless terminal devices TA to TH shown in FIG. 1. FIG. 3 is a block diagram showing a configuration of each of the repeaters $111_1$ to $111_n$ shown in FIG. 1 FIG. 4 is a diagram showing a synchronization signal transmitted from the master repeater $111_1$ to the system bus 115 and a time slot following the synchronization signal and allocated to each repeater. FIGS. 5A and 5B are diagrams showing a format of a communication frame exchanged between the repeater and the wireless terminal device. The communication frame includes a header part and a data part. The detail of the header part and that of the data part will be discussed later.

As shown in FIG. 2, each of the wireless terminal devices TA to TH includes, as a signaling block, an antenna ANTSR, a transmitting/receiving changing unit 11, a transmitting unit 12, a baseband processing unit 13, an A/D converter 14, a microphone 15, a receiving unit 16, a baseband processing unit 17, a D/A converter 18, and a speaker 19. Moreover, each of the wireless terminal devices TA to TH includes, as a control block, a controller 20, a clock unit 25, a display unit 26, and an operating unit 27. Furthermore, the controller 20 includes a CPU (Central Processing Unit) 21, an I/O (input/output unit) 22, a RAM (Random Access Memory) 23, a ROM (Read Only Memory) 24, and an internal bus connecting those one another.

The signaling block of each of the wireless terminal devices TA to TH is controlled by the CPU 21. The CPU 21 runs a control program stored in the ROM 24 to control the wireless terminal device overall, processes a command and data input from the operating unit 27 through the I/O 22, and data obtained from the baseband processing unit 17 and temporarily stores such command or data in the RAM 23. Moreover, the CPU 21 causes the display unit 26 comprising an LCD (Liquid Crystal Display) or the like to display the stored command and data as needed. The CPU 21 causes the display unit 26 to display a current time obtained by the clock unit 25. The controller 20 may employ a structure to which a rewritable nonvolatile memory card like a flash memory recording unique identification information of the wireless terminal device is detachably attached.

Next, regarding the signaling block, the transmitting/receiving changing unit 11 has an input end connected to the antenna ANTSR, and has an output end selectively connected to the transmitting unit 12 or the receiving unit 16 under the control by the CPU 21. When no transmitting operation is given through the operating unit 27, the wireless terminal device is in a receiving (standby) mode, and the output end of the transmitting/receiving unit 11 is connected to the receiving unit 16. Conversely, when a transmitting operation is given through the operating unit 27, the wireless terminal device becomes a transmitting mode, and the output end of the transmitting/receiving unit 11 is connected to the transmitting unit 12.

When each of the wireless terminal devices TA to TH is in a transmitting mode, the microphone 15 outputs an analog voice signal to the A/D converter 14 in accordance with a sound input given by the user.

The A/D converter 14 converts the analog voice signal from the microphone 15 to a digital voice signal, and outputs the digital voice signal to the baseband processing unit 13.

The baseband processing unit 13 generates a communication frame (a baseband signal) in a predetermined format based on the digital voice signal output by the A/D converter 14 or data stored in the RAM 23 of the controller 20, and outputs the communication frame to the transmitting unit 12.

The transmitting unit 12 modulates a carrier wave using the communication frame output by the baseband processing unit 13, and transmits the carrier wave to the repeater in a relay operation through the transmitting/receiving changing unit 11 and the antenna ANTSR. An example of the modulation scheme by the transmitting unit 12 is GMSK (Gaussian filtered Minimum Shift Keying), PSK (Phase Shift Keying), QAM (Quadrature Amplitude Modulation) or FSK (Frequency Shift Keying).

When each of the wireless terminal devices TA to TH is in a receiving mode, the transmitting/receiving changing unit 11 connects the antenna ANTSR to the receiving unit 16. The receiving unit 16 receives a radio signal from each of the repeaters $111_1$ to $111_n$ through the antenna ANTSR. The receiving unit 16 amplifies the received signal and performs a signal processing like a demodulation process on the received signal, and outputs a demodulated signal to the baseband processing unit 17.

The baseband processing unit 17 extracts a communication frame from the demodulated signal output by the receiving unit 16. The baseband processing unit 17 outputs information on a header part H of the extracted communication frame to the CPU 21. The CPU 21 analyzes the information on the header part H, and when the transmission destination of the received signal is the own station, outputs data on a voice signal included in a data part D to the D/A converter 18, temporarily stores data other than the voice signal included in the data part D in the RAM 23, and causes the display unit 26 to display such data as needed. The D/A converter 18 converts the voice signal by the baseband processing unit 17 from digital to analog, and outputs it to the speaker 19. The speaker 19 outputs the analog voice signal as a voice output.

As shown in FIG. 3, each of the repeaters $111_1$ to $111_n$ includes, as a signaling block, an antenna ANTS for transmission only, a transmitting unit 32, a baseband processing unit 33, an antenna ANTR for reception only, a receiving unit 36, a baseband processing unit 37, an input unit 6, an output unit 7, and a network I/F (interface) 8. Each repeater also includes, as a control block, a controller 40, a clock unit 45, a display unit 46, and an operating unit 47. Furthermore, the controller 40 includes a CPU (Central Processing Unit) 41, an I/O (input/output unit) 42, a RAM (Random Access Memory) 43, a ROM (Read Only Memory) 44, and an internal bus (not illustrated) connecting those one another. The ROM 44 stores a trouble handling program when the master repeater breaks down and becomes unable to output a synchronization signal over the system bus 115 together with the normal operation of the CPU 41.

The clock unit 45 includes, as shown in FIG. 4, an elapsed time timer T1, an 80-ms timer T2, and a current time timer T3. The elapsed time timer T1 counts an elapsed time after a synchronization signal is output over the system bus 115. The 80-ms timer T2 counts 80 ms corresponding to a frame period. The current time timer T3 counts a current time. When detecting a synchronization signal over the system bus 115, the CPU 41 resets the elapsed time timer T1.

Each of the repeaters $111_1$ to $111_n$ has a bus I/F (interface) 9 for transmitting its own information to the system bus 115 and for obtaining information from another repeater. The ROM 44 registers a reference value of an elapsed time until it is determined that the own repeater becomes to operate as a master repeater.

Each of the repeaters $111_1$ to $111_n$ performs signal processing, such as an amplification process or a waveform processing, on a radio signal received from a departure wireless terminal device (e.g., the wireless terminal device TA), and transmits the processed signal to a destination wireless terminal device (e.g., the wireless terminal device TB), so that each of the repeaters $111_1$ to $111_n$ basically has the same configuration as that of each of the wireless terminal devices TA to TH shown in FIG. 2. Hence, the same structural element as that of each of the wireless terminal devices TA to TH will be denoted by the same reference numeral, and the duplicated explanation for the operation of such same structural element as that of each of the wireless terminal devices TA to TH will be omitted.

When the wireless terminal devices TA to TH communicate one another through the repeaters $111_1$ to $111_n$, an uplink from the wireless terminal device to the repeater and a downlink from the repeater to the wireless terminal device are subjected to communication at substantially same time with a frequency or a time slot being changed. Hence, each of the repeaters $111_1$ to $111_n$ has the antenna ANTS for transmission only and the antenna ANTR for reception only. Moreover, as shown in FIG. 1, each of the repeaters $111_1$ to $111_n$ is connected one another through the system bus 115, and is connected to the server 104 through the communication line 116 like an IP connection line.

The input unit 6, under an input control by the CPU 41, outputs data or the like which is written in a synchronization signal and which is requested by another repeater or the server 104 through the network I/F 8. Moreover, when a multi-site network for communicating with another site 10 configuring another communication area is established, the input unit 6 exchanges a communication frame with each of the repeaters 1 to n in another site 10 through the network I/F 8. The bus I/F 9 mediates acquisition of a synchronization signal transmitted to the system bus 115 by the master repeater, repeater information transmitted to the system bus 115 from other repeaters than the own repeater under an input control by the CPU 41, and transmission of its own information (information on the local device) to the system bus 115 under an output control by the CPU 41.

Next, an explanation will be given of a wireless communication method by the wireless terminal system according to the present embodiment with reference to FIGS. 5 and 7.

Figure 5:
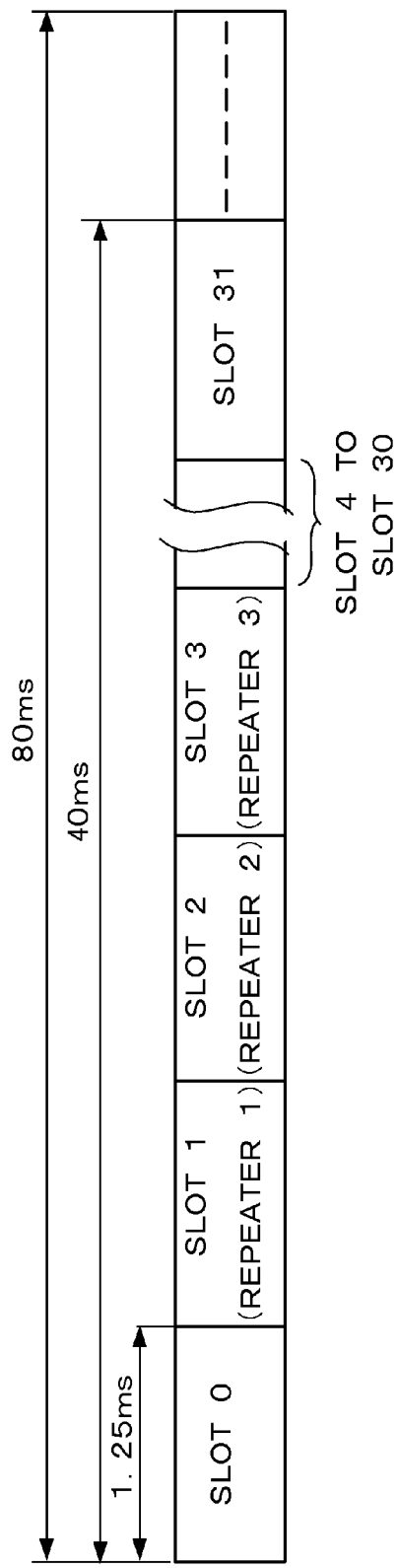
FIG. 5 is a diagram showing a synchronization signal transmitted to a system bus from a master repeater and a time slot following the synchronization signal and allocated to each repeater.

A synchronization signal shown in FIG. 5 has a period of 80 ms, and the first half 40 ms includes 32 slots from a slot 0 to a slot 31. Accordingly, each slot has a time length of 1.25 ms. The first slot 0 is the synchronization signal, and is transmitted by a specific repeater, i.e., the master repeater $111_1$ in accordance with a predetermined algorithm, and other repeaters $111_2$ to $111_n$ serve as slave repeaters, and obtain this synchronization signal. The repeaters $111_1$ to $111_n$, i.e., the repeater system 130 operates in synchronization with the synchronization signal. Any one of the slots 1 to 31 other than the slot 0 for synchronization is allocated to each of the repeaters $111_1$ to $111_n$. Each of the repeaters $111_1$ to $111_n$ writes information on each repeater to be sheared in the allocated slot. The repeater $111_1$ that is the master repeater transmits the synchronization signal at the slot 0, and writes information on the repeater $111_1$ (e.g., information indicating whether the repeater $111_1$ is not currently used or in a relaying operation) in the slot allocated to the repeater $111_1$ among the slots 1 to 31. The last slot 31 is used for a connection to an external device for a future extended function.

Figure 6:
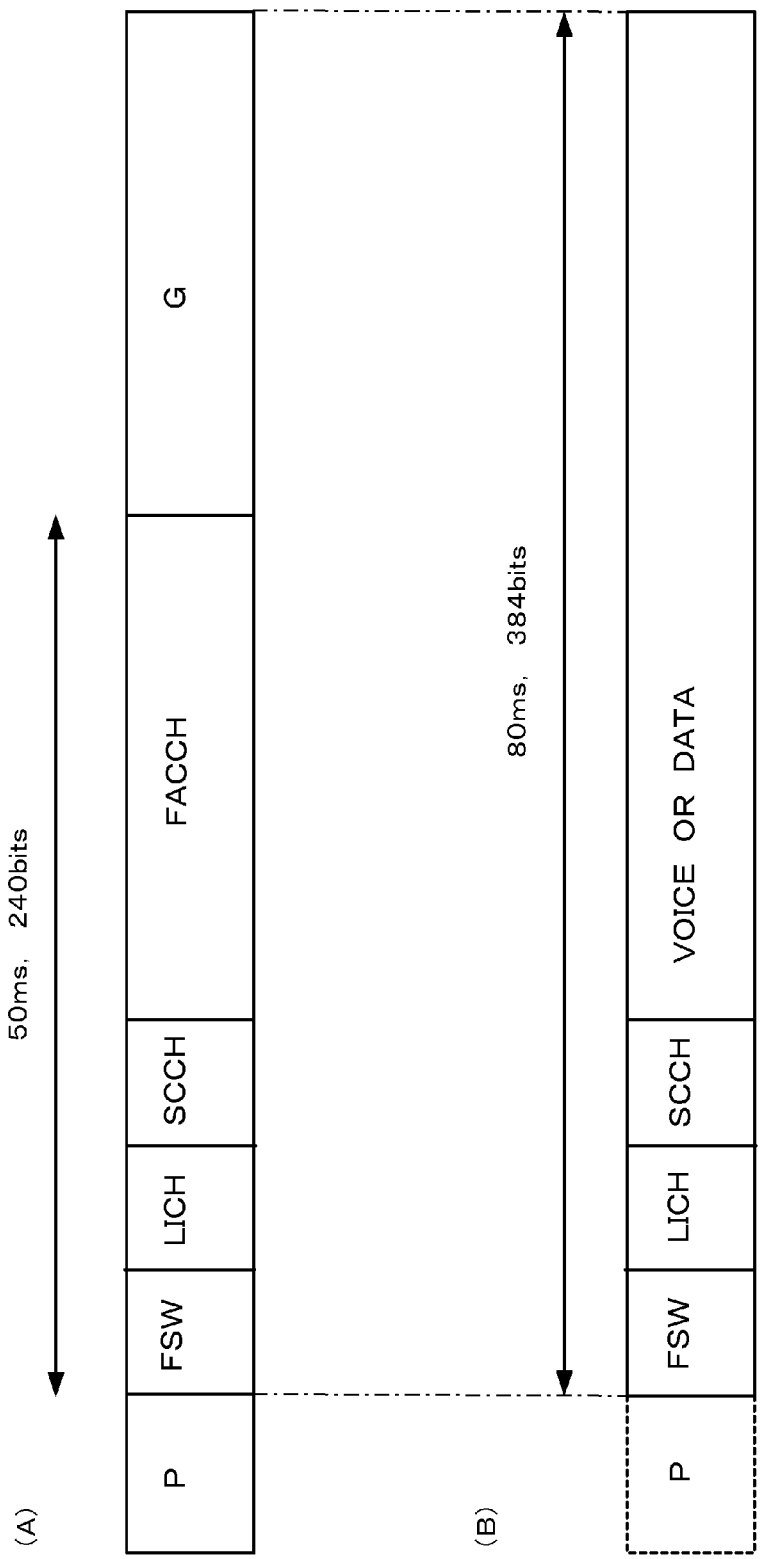
FIG. 6 is a diagram showing a format of a communication frame exchanged between a repeater and a wireless communication device.

FIG. 6A shows an illustrative format of a communication frame when a link with a communication channel is established, and FIG. 6B shows an illustrative format of a communication frame at the time of voice or data communication. In FIGS. 6A and 6B, the format of the communication frame is 80 ms and 384 bits. Moreover, as far as an initial transmission, a preamble (P) of equal to or greater than 24 bits is added to the header of the frame. FSW is a frame synchronization word, LICH is a link information channel, SCCH is a signaling information channel for a trunking control, FACCH is a fast-speed associated control channel, and G is a guard time.

As explained above, the master repeater transmits a synchronization signal at the slot 0 shown in FIG. 5, the other repeaters that are slave repeaters to the master repeater obtain this synchronization signal, and the repeater system 130 including the master repeater operates in synchronization with this synchronization signal. The synchronization signal is transmitted over the system bus 115 every 80 m sec which is equal to the period of the communication frame. The wireless communication system of the present embodiment causes a repeater among the repeaters $111_1$ to $111_n$ to serve as a master repeater in accordance with a predetermined rule at the time of an initial activation. The repeaters other than the master repeater automatically serve as slave repeaters, and obtain a synchronization signal transmitted by the master repeater. Any one of the slots 1 to 30 is allocated to each repeater configuring the repeater system. Moreover, each repeater grasps the slots allocated to another repeater. A timing of transmitting a synchronization signal and that of transmitting information to the allocated slot are decided by the clock unit 45. That is, the synchronization signal is transmitted for each 80 m sec, and information on the own repeater is transmitted by counting a time up to the allocated slot from transmission of the synchronization signal. In consideration of such operation, an explanation will be given of an operation when an arbitrary repeater serves as a mater repeater and the other repeaters serve as slave repeaters with reference to the flowchart of FIG. 7 executed by the CPU 41 shown in FIG. 3.

In order to facilitate the reader's understanding, as shown in FIG. 8, it is presumed that there are repeaters, from 1st to nth repeaters 111, and each repeater has the ROM 44 storing the priority to be a master repeater and a clocked time both set therein.

When all repeaters $111_1$ to $111_n$ are powered on, and in an initializing process, any one repeater among the plurality of repeaters $111_1$ to $111_n$ starts operating as a master repeater.

At the time of an initializing operation, respective CPUs 41 of all repeaters initialize the elapsed time timer T1 of the clock unit 45.

Figure 7:
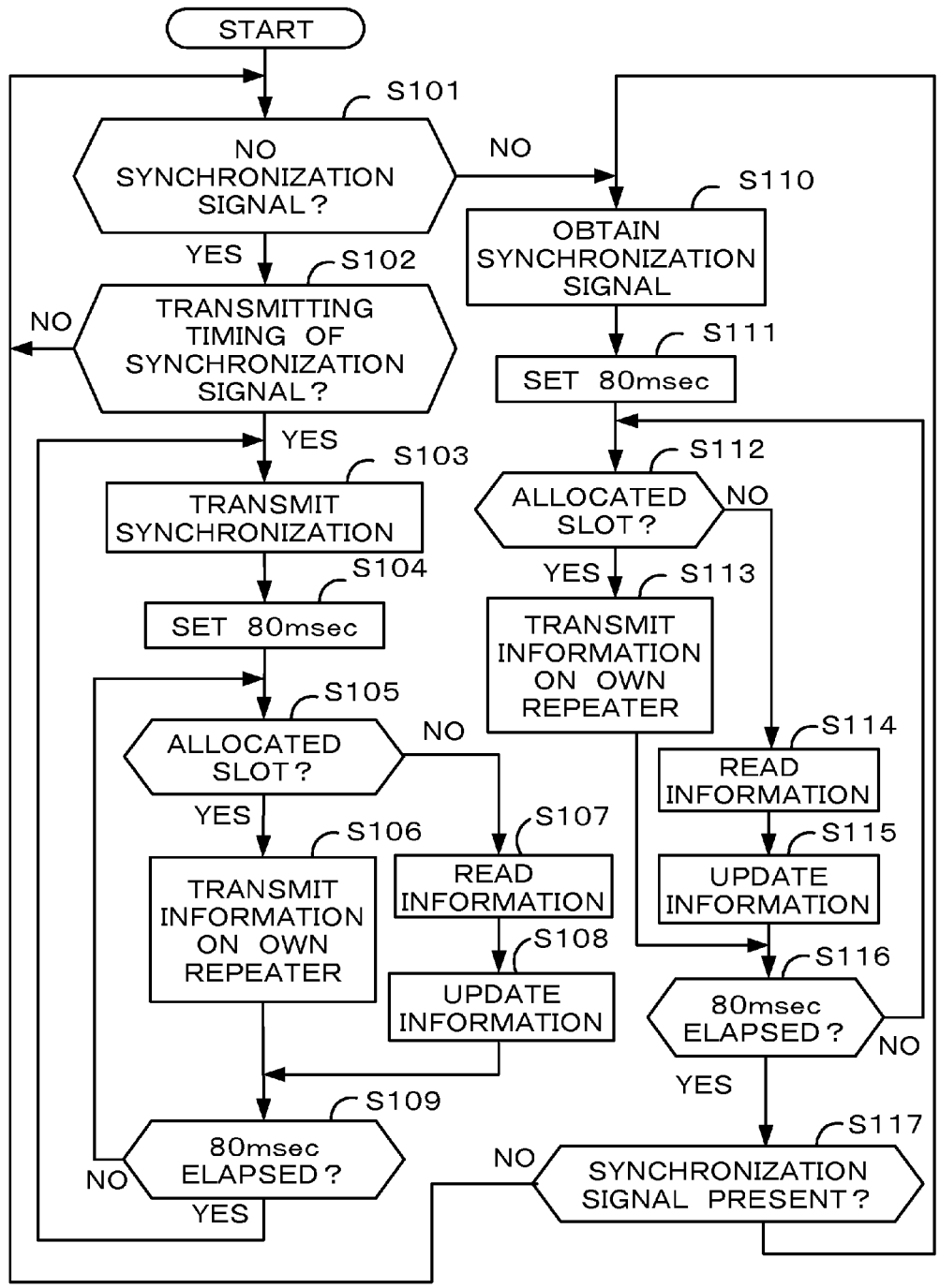
FIG. 7 is a flowchart executed by a CPU of the repeater shown in FIG. 1.

In FIG. 7, the CPU 41 determines whether or not a synchronization signal has been output over the system bus 115 (step S101). When it is determined that the synchronization signal has not been output (step S101: YES), the CPU further determines whether or not it is a timing at which the own repeater writes the synchronization signal based on the elapsed time timer T1 (step S102). When it reaches the clocked time (see FIG. 8) of the elapsed time timer T1, the CPU determines that it is a timing at which the own repeater writes the synchronization signal (step S102: YES), and when the own repeater is not the master repeater (the priority: equal to or lower than second), the CPU determines that it is not a timing at which the own repeater writes the synchronization signal (step S102: NO), and the process returns to the step S101.

After 80 ms has elapsed from the activation, the clocked time by the elapsed time timer T1 reaches the reference time of the repeater $111_1$, and the CPU determines that it is a timing at which the own repeater writes the synchronization signal (step S102: YES).

When it is presumed that the repeater $111_1$ breaks down, it is determined in the step S101 (YES) that there is no synchronization signal. When the condition that there is no synchronization signal goes on for over 82 ms (80 ms (a period)+a slot period+a certain margin time), in the step S102, the count value of the elapsed time timer T1 of the master repeater $111_3$ that has a second priority reaches the reference value (82 ms), and the CPU of the repeater $111_3$ determines that it is a timing at which the own repeater writes the synchronization signal.

When it is presumed the repeaters $111_1$ and $111_3$ having the first and second priorities, respectively, break down, it is determined in the step S101 (YES) that there is no synchronization signal. When a condition in which there is no synchronization signal goes on for over 84 ms, in the step S102, the count value of the elapsed time timer T1 of the master repeater $111_4$ that has the third priority reaches the reference value (84 ms), and the CPU of the repeater $111_4$ determines that it is a timing at which the own repeater writes the synchronization signal.

When it is presumed that the repeaters $111_1$, $111_3$, and $111_4$ having the first to third priorities, respectively, break down, it is determined in the step S101 (YES) that there is no synchronization signal. When a condition in which there is no synchronization signal goes on for over 86 ms, in the step S102, the count value of the elapsed time timer T1 of the master repeater $111_n$ that has the fourth priority reaches the reference value (86 ms), and the CPU of the repeater $111_n$ determines that it is a timing at which the own repeater writes the synchronization signal.

In this fashion, the process from the step S101 to the step S102 is repeated until any one repeater among the repeaters $111_1$ to $111_n$ transmits a synchronization signal at first to be a master repeater.

When no synchronization signal is transmitted to the system bus 115 (step S101: YES), and when the CPU determines that it is a timing at which a synchronization signal is transmitted (step S102: YES), the synchronization signal is transmitted the system bus 115 (step S103). As the synchronization signal is transmitted to the system bus 115, each CPU 41 resets the elapsed time in the clock unit 45 after the synchronization signal is output to be 0. The repeater that has transmitted the synchronization signal over the system bus 115 becomes the master repeater.

The repeater that has become the master repeater causes the 80-ms timer T2 to start measuring a period of a slot including the synchronization signal (step S104).

Next, the CPU determines whether or not it becomes the timing of the allocated slot based on an elapsed time after the synchronization signal has been output (step S105), and when determining that it becomes the timing of the allocated slot the CPU writes information on the own repeater in that slot (step S106). Conversely, when the CPU determines that it is not the timing of the allocated slot, i.e., determines that it is the timing of the slot allocated to the other repeater, the CPU reads information output to the system bus 115 in that slot (step S107). Thereafter, information stored in the RAM 43 is updated with the read information (step S108).

After information on the own repeater is written in the step S106, or after the information is updated in the step S108, it is determined whether or not 80 m sec has been elapsed based on the count value by the 80-ms timer T2 (step S109). When it is determined that 80 m sec has not been elapsed yet, the process returns to the step S105, and the process in the step S106 or the processes in the step S107 and the step S108 are repeated. Conversely, when it is determined that 80 m sec has been elapsed, the process returns to the step S103, and a synchronization signal is written in the header of a next period.

When it is determined in the step S101 that the synchronization signal has been output over the system bus 115, because the other repeater operates as the master repeater, the own repeater operates as a slave repeater. That is, the synchronization signal written by the master repeater is obtained from the system bus 115 (step S110), and the clock unit 45 is caused to start measuring 80 m sec that corresponds to a period of the slot including the synchronization signal (step S111).

Next, the CPU determines whether or not it becomes a timing of the allocated slot based on the count value by the elapsed time timer T1 (step S112), and when determining that it becomes the timing of the allocated slot, the CPU writes information on the own repeater in that slot (step S113). Conversely, when determining that it is not the timing of the allocated slot, i.e., when determining that it is a timing of a slot allocated to another repeater, the CPU reads information from that slot (step S114). Thereafter, information stored in the RAM 43 is updated with the read information (step S115).

After the information on the own repeater is written in the step S113 or after the information is updated in the step S115, it is determined whether or not 80 m sec has been elapsed (step S116). When it is determined that 80 m sec has not been elapsed yet, the process returns to the step S112, and the process in the step S113 or the processes in the step S114 and the step S115 are repeated. Conversely, when it is determined that 80 m sec has been elapsed, it is determined whether or not there is a synchronization signal in the header of a next period over the system bus 115 (step S117). When it is determined that there is a synchronization signal, such synchronization signal is obtained (step S110).

When it is determined in the step S117 that there is no synchronization signal, this means that the master repeater $111_1$ which has been transmitting the synchronization signal becomes to have some reason that such a master repeater is unable to transmit the synchronization signal. For example, such reason may occur when the master repeater breaks down, when the master repeater is separated from the repeater system 130, or when the system bus 115 connecting the repeaters $111_1$ to $111_n$ one another becomes discontinuous in the halfway thereof. In this case, the process returns to the step S101, and any one repeater among the repeaters that are slave repeaters starts operating as a master repeater. That is, the process from the step S102 to the step S109 is executed. As any one of the repeaters that are slave repeaters starts transmitting a synchronization signal, the remaining repeaters repeat the process from the step S110 to the step S117 as the slave repeaters.

As explained above, according to the present embodiment, when no synchronization signal is transmitted over the system bus 115, a master repeater is selected from the plurality of repeaters (e.g., the repeaters $111_2$ to $111_n$ shown in FIG. 1) in accordance with a criterion, transmits a synchronization signal over the system bus 115, and transmits information to the system bus 115 in synchronization with the synchronization signal. When the synchronization signal is transmitted to the system bus 115, other repeaters become slave repeaters, and transmit information to the system bus 115 in synchronization with the synchronization signal transmitted by the master repeater. Therefore, according to the present embodiment, when the wireless terminal devices TA to TF communicate one another through the plurality of repeaters $111_1$ to $111_n$ connected one another through the system bus 115, if the master repeater (e.g., the repeater $111_1$ shown in FIG. 1) that transmits the synchronization signal over the system bus 115 breaks down, a specific repeater (e.g., the repeater $111_2$) selected from the remaining repeaters (the repeaters $111_2$ to $111_n$) in accordance with a specific procedure becomes to serve as a master repeater automatically.

That is, when each of the repeaters $111_1$ to $111_n$ detects that any one of the repeaters (e.g., the repeater $111_1$ shown in FIG. 1) is transmitting a synchronization signal as a mater repeater over the system bus, each of the repeaters transmits no synchronization signal. Thereafter, if, for example, the master repeater $111_1$ breaks down, a repeater $111_2$ among the other repeaters $111_2$ to $111_n$ automatically becomes a master repeater, so that the wireless communication system can run without any termination. Moreover, when it is not a breakdown, but if the system bus is disconnected on the halfway thereof and the repeater system 130 is divided into plural systems, a new master repeater is selected at a repeater system 130 where the master repeater is not originally present, and the system can run without any termination. Furthermore, if the original master repeater $111_1$ that has broken down or the like and disconnected is repaired and recovered (reconnected), because the new master repeater $111_2$ is transmitting a synchronization signal already, the recovered repeater $111_1$ transmits no synchronization signal, so that the wireless communication system can run without any new setting.

If the criterion is just an order of channel number or the like, when the original master repeater $111_1$ recovers, a process of setting a master repeater again becomes necessary. Various problems such that it may be that both repeater $111_2$ which has newly become a master repeater and original repeater $111_1$ transmit respective synchronization signals are expected, but such problems do not occur according to the present embodiment.

Moreover, according to the present embodiment, when one or equal to or greater than two repeaters (e.g., the master repeaters $111_1$ and $111_2$) among the plurality of repeaters (the repeaters $111_1$ to $111_n$ shown in FIG. 1) connected to the system bus 115 are eliminated, a specific repeater (e.g., the repeater $111_4$) selected from the remaining repeaters (the repeaters $111_3$ to $111_n$) can automatically serve as a master repeater.

Furthermore, according to the present embodiment, when a system is built at first using the plurality of repeaters (e.g., the repeaters $111_1$ to $111_n$ shown in FIG. 1), or when one or equal to or greater than two repeaters (e.g., the master repeaters $111_1$ and $111_2$) are eliminated, in an initial condition in which each repeater is powered on, a specific repeater selected from those repeaters automatically serves as a master repeater.

The foregoing embodiment is for explaining the present invention, and the present invention is not limited to the foregoing embodiment, and other embodiments and modified examples which can be thought out by those skilled in the art within the scope and the spirit of the present invention are included in the scope and the spirit of the present invention.

For example, in an activation process in which all repeaters $111_1$ to $111_n$ are just powered on, when a difficulty that a master repeater is unable to transmit a synchronization signal happens, and it is necessary to set a new master repeater, the following method can be applied.

Depending on a serial number (ESN: Electric Serial Number) uniquely written in each repeater, a time difference is set to a timing at which a synchronization signal is written in a synchronization slot, and when any one of the repeaters transmits the synchronization signal, the other repeaters transmit no synchronization signal.

More specifically, at the time of activation of the system, the ESN of each of the repeaters $111_1$ to $111_n$ sets a time difference at respective timings at which a synchronization signal is transmitted. Thereafter, when it becomes a condition in which no synchronization signal from the master repeater $111_1$ that has been selected initially is detected, the slave repeaters $111_2$ to $111_n$ substantially simultaneously detect that no synchronization signal is transmitted. The slave repeaters $111_2$ to $111_n$ which detect that no synchronization is transmitted wait for respective timing at which each own repeater transmits a synchronization signal, and because a timing at which a synchronization signal is transmitted when it is detected that no synchronization signal is transmitted has a time difference for each repeater $111_2$ to $111_n$, in this case, like the activation of the system, when any one of the repeaters (e.g., the repeater $111_2$ shown in FIG. 1) starts transmitting a synchronization signal, the remaining repeaters $111_3$ to $111_n$ transmit no synchronization signal.

In addition to the scheme of setting a master repeater based on the ESN, a repeater which will be a master repeater may be set beforehand based on a channel order, or a repeater that is set to write information in a first slot which is not a synchronization signal may be set as a master repeater beforehand. Alternatively, at the time of activation process when a power is turned on, a qualification to be a master repeater and a qualification not to be a master repeater may be decided. In this case, when any one of the repeaters starts transmitting a synchronization signal, the other repeaters transmit no synchronization signal.

Moreover, a synchronization signal for establishing a synchronization among the individual repeaters utilizes a frame synchronization for a digital wireless communication system, and the synchronization signal is written in a slot for synchronization for each 80 m sec interval. Because all repeaters attempt to establish a synchronization at this timing, the communication frames transmitted by respective repeaters in the same site are also synchronized one another. Therefore, if the wireless communication device changes a communication channel, because a synchronization is maintained, it is possible to establish a frame synchronization rapidly, and a communication is also enabled rapidly.

According to the foregoing embodiment, a relay device corresponds to each of the repeaters $111_1$ to $111_n$, a master relay device corresponds to the repeater $111_1$, a slave relay device corresponds to each of the repeaters $111_2$ to $111_n$, a communication line corresponds to the communication line 5, a wireless terminal device corresponds to each of the wireless terminal devices TA to TH, and a relay system corresponds to the repeater system 130.

DESCRIPTION OF REFERENCE NUMERALS

TA to TH Wireless terminal device
$111_1$ to $111_n$ Repeater
115 System bus (communication line)
41 CPU
42 RAM
45 Clock unit

The invention claimed is:

1. A relay system comprising a plurality of relay devices which are connected to one another through a single communication line and in which the relay devices operate within a single communication area, and to which respective unique relay channels are allocated, wherein the unique relay channels are predetermined independent of time and facilitate communication between wireless terminal devices, and wherein each relay device is configured to wirelessly transmit control information generated based on information obtained from the single communication line to a wireless terminal device in order to select a relay channel for the wireless terminal device registered in the own relay device to communicate with an other wireless terminal device, wherein
   the plurality of relay devices comprise a master relay device which transmits a synchronization signal over the single communication line and which communicates with the single communication line in synchronization with the synchronization signal, and an other slave relay device which obtains the synchronization signal through the single communication line and which communicates with the single communication line in synchronization with the synchronization signal, and
   when each of the relay devices detects a condition in which no synchronization signal is transmitted over the single communication line, a relay device starts transmitting a synchronization signal in accordance with a predetermined rule, and the relay device which has transmitted the synchronization signal serves as the master relay device.

2. The relay system according to claim 1, wherein when detecting a condition in which no synchronization signal is transmitted over the single communication line, each of the relay devices transmits a synchronization signal in accordance with a predetermined rule that is a different output timing.

3. The relay system according to claim 1, wherein when each of the relay devices detects a condition in which no synchronization signal is transmitted over the single communication line, a relay device selected in accordance with a predetermined rule starts transmitting a synchronization signal.

4. A relay device which is connected to an other relay device through a single communication line and to which a unique relay channel is allocated, wherein the unique relay channel is predetermined independent of time and facilitate communication between wireless terminal devices, and wherein the relay devices operate within a single communication area and each of the relay devices is configured to wirelessly transmit control information generated based on information obtained from the single communication line to a wireless terminal device in order to select a relay channel for the wireless terminal device registered in the own relay device to communicate with an other wireless terminal device, the relay device including:
   a function as a master relay device which transmits a synchronization signal over the single communication line and which communicates with the single communication line in synchronization with the synchronization signal; and
   a function as a slave relay device which obtains a synchronization signal through the single communication line and which communicates with the single communication line in synchronization with the synchronization signal,
   wherein when detecting a condition in which no synchronization signal is transmitted over the single communication line, the relay device starts transmitting a synchronization signal in accordance with a predetermined rule, and when the relay device is the first relay device that has transmitted the synchronization signal, the relay device functions as the master relay device.

5. A synchronization method in a relay system comprising a plurality of relay devices which are connected to one another through a single communication line and in which the relay devices operate within a single communication area, and to which respective unique relay channels are allocated, wherein the unique relay channels are predetermined independent of time and facilitate communication between wireless terminal devices, and wherein each of the plurality of relay devices comprises a master relay device which transmits a synchronization signal over the single communication line and which communicates with the single communication line in synchronization with the synchronization signal, and an other slave relay device which obtains the synchronization signal through the single communication line and which communicates with the single communication line in synchronization with the synchronization signal, each relay device being configured to wirelessly transmit control information generated based on information obtained from the single communication line to a wireless terminal device in order to select a relay channel for the wireless terminal device registered in the own relay device to communicate with an other wireless terminal device, wherein when detecting a condition in which no synchronization signal is transmitted over the single communication line, each of the relay devices starts transmitting a synchronization signal in accordance with a predetermined rule, and the first relay device that has transmitted the synchronization signal serves as the master relay device.

* * * * *